J. STANLEY.
Bits for Horses.
No. 213,258.  Patented Mar. 11, 1879.
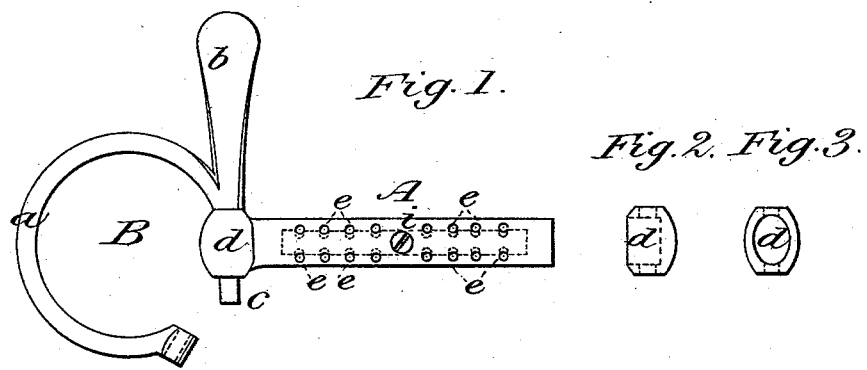

UNITED STATES PATENT OFFICE.

JAMES STANLEY, OF NEWARK, NEW JERSEY.

IMPROVEMENT IN BITS FOR HORSES.

Specification forming part of Letters Patent No. 213,258, dated March 11, 1879; application filed December 18, 1878.

*To all whom it may concern:*

Be it known that I, JAMES STANLEY, of the city of Newark, in the county of Essex and State of New Jersey, have invented certain new and useful Improvements in Bits for Horses; and I do hereby declare that the following is a full, clear, and exact description of the invention, which will enable others skilled in the art to which it appertains to make and use the same, reference being had to the accompanying drawings, and to letters of reference marked thereon, which form a part of this specification.

My improvement in bridle-bits for horses consists, first, in a tubular perforated mouth-piece provided with closed ends, and having a central aperture for the admission of water or medicated liquids or compounds, the said aperture being closed by a removable stopper; secondly, in the combination, with the said tubular perforated mouth-piece having a central aperture, of enlarged hollow bosses, permanently secured upon the ends of the tube, and cheek-pieces with shanks passed through the said hollow bosses.

In the accompanying drawings, Figure 1 represents a tubular perforated mouth-piece of a bridle-bit formed with the central aperture, and having the screw-stopper applied thereto. In this figure the boss and cheek-piece are shown upon one end of the tube only, it being intended, however, to apply the same to both ends.

Figs. 2 and 3 represent the boss in different positions.

A sponge or other porous substance may be inclosed by the hollow mouth-piece, in which case water or medicated liquids will be readily introduced by removing the screw-stopper; or medicated compounds, when employed without the sponge, will be admitted into the tube through the same medium.

This arrangement affords in all cases an effective means for the equal distribution throughout the tube of the substances introduced, and also admits of a considerable simplification of the method of closing up the ends of the mouth-piece, and of connecting the cheek-pieces therewith, as will be now described.

I form enlarged hollow bosses or heads upon the ends of the mouth-piece by fitting and brazing thereto the hollow bosses, $d$, and through each of these bosses the shank $b$ of a cheek-piece, B, is passed, suitable openings being formed in the boss or head, or in a portion of the boss and the ends of the tube, for such purpose. In this way the ends of the tubular mouth-piece will be permanently closed, a cheap and light boss or head provided for the same, the employment of screw-threads avoided, and the cheek-piece connected with the bit in a simple and effective manner.

The shank of the cheek-piece is fitted to the boss, and the ring $a$ is connected with the shank in any suitable way.

The ring of the cheek-piece shown in Fig. 1 is represented as being ready for the union of its free end with the shank $b$.

As the bosses $d$ are hollow, they may be made massive and ornamental, and at the same time be light and strong.

I am aware that tubular perforated bits are not new; and hence

What I claim is—

1. The tubular perforated mouth-piece provided with closed ends and a central aperture for the admission of liquids or medicated compounds, the said aperture being closed by a screw-stopper, substantially as specified.

2. The tubular perforated mouth-piece provided with a central aperture, in combination with hollow bosses permanently secured upon its ends, and cheek-pieces having shanks passed through the said bosses, substantially as shown and described.

In testimony that I claim the foregoing as my own I hereunto affix my signature in presence of two witnesses.

JAMES STANLEY.

Witnesses:
 OLIVER DRAKE,
 J. INSLEE.